Sept. 19, 1961 J. R. DENNIS 3,000,638

RECORD RECORDING AND PLAYING DEVICE

Filed April 23, 1956 2 Sheets-Sheet 1

INVENTOR.
JAMES R. DENNIS,
BY Thomas P. Mahoney
ATTORNEY.

Sept. 19, 1961 J. R. DENNIS 3,000,638

RECORD RECORDING AND PLAYING DEVICE

Filed April 23, 1956 2 Sheets-Sheet 2

JAMES R. DENNIS,
INVENTOR.

BY Thomas P. Mahoney
ATTORNEY.

3,000,638
Patented Sept. 19, 1961

1

3,000,638
RECORD RECORDING AND PLAYING DEVICE

James R. Dennis, 9812 Wanda Park Drive,
Beverly Hills, Calif.

Filed Apr. 23, 1956, Ser. No. 579,987
3 Claims. (Cl. 274—13)

This invention relates to a recording mechanism whereby auditory signals may be impressed upon still photographs and similar nonmoving visual images in order that a message or statement pertinent to the subject matter depicted in the still photograph may be associated therewith and constitute a part thereof.

Also within the purview of my invention is the provision of a composite recording blank, said blank including a base to one side of which is applied a light-sensitive emulsion to permit the printing of a visual image thereupon and to the other side of which is applied a magnetically responsive coating adapted for the reception of an auditory signal.

Also within the scope of my invention is the provision of a method of creating a talking still photograph or other visual image whereby an auditory message is applied to a magnetically responsive coating on one side of a blank or base adapted to support the photoprint or visual image on the other side thereof.

Applications for the recorder, recording blank, and method of my invention are numerous. For instance, attempts are now made to preserve significant data relevant to photographs by inscribing a message on a portion of the negative and such conventional expedients are quite inadequate because the space available for recording such messages by writing upon the negative is relatively limited. However, if the photographs are printed upon a recording blank constructed in accordance with the teachings of my invention, the person taking the photograph can, a short time after the photograph has been made, record his impression of the visual image constituting the content of the photograph. Moreover, it is well known that employee and police records involve the use of photographs of numerous individuals and, in the case of police records particularly, a separate recording is made upon wire or tape so that when a photograph is extracted from the files the recording can be played in an attempt to adequately identify the person shown in the photograph.

The correlation of the photograph and the recording involves enlarged storage facilities and considerable expenditure of time, whereas, if the recording is made upon the back of the photographic blank by the use of the recording mechanism of my invention, the recording is immediately available to be played back in an attempt to ascertain whether the identity of the person shown in the photograph is substantiated by the recorded sound of his voice.

An object of my invention is the provision of a recording mechanism which includes means for supporting a record blank against movement thereupon and which incorporates a magnetic recording head translatable in a primary path and a secondary path on first and second carriage means movable, respectively, along said primary and secondary paths.

Another object of my invention is the provision of a recording mechanism of the aforementioned character wherein the first carriage is constituted by a rotary table and wherein the second carriage is movable in a longitudinal direction with reference to said rotary table and, more particularly, radially thereof, said second carriage being provided with a recording head translatable upon the magnetically susceptible surface of the recording blank which is disposed in operative relationship therewith.

Another object of my invention is the provision of a recording mechanism of the aforementioned type wherein the first and second carriages are driven from a common motor, the first carriage being directly connected to the drive motor and the second carriage being indirectly connected to the drive motor through an operative connection provided on the first carriage.

A further object of my invention is the provision of a recording mechanism of the aforementioned character wherein the second carriage includes release means adapted to release it from its driving connection to the first carriage in order that it may be manually shifted to a replay or record position at the will of the user thereof.

An additional object of my invention is the provision of a record blank, said record blank including one surface coated with a photographic emulsion for the reception of a visual image thereupon and another surface provided with a magnetically susceptible material which, upon exposure to a magnetic recording head, will receive an auditory signal constituting a message relevant to the visual image on the other side of the blank.

Also within the scope of my invention is the provision of a record blank having a magnetically susceptible coating on one side thereof and having provided on the opposite side thereof means for mounting or securing a photoprint or other visual image upon said other side.

Other objects and advantages of my invention will be apparent from the following specification and the accompanying drawings which are for the purpose of illustration only and in which.

Figure 1:
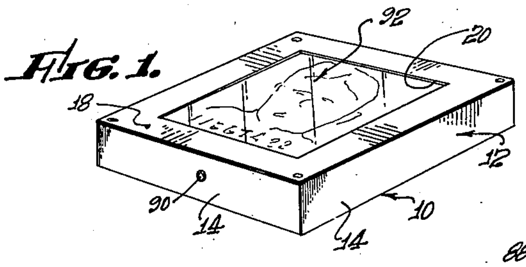
FIG. 1 is a perspective view showing a recording mechanism constructed in accordance with the teachings of my invention.

Referring to the drawings and particularly to FIGS. 1–4 thereof, I show a record recording and playing device 10 constructed in accordance with the teachings of my invention and incorporated in a substantially square housing 12 formed from sheet metal, or the like, and including vertically oriented side walls 14, a bottom wall 15 associated with said side walls, and a top wall 18. Formed in the top wall 18 is a substantially square depressed area 20, for a purpose which will be described in greater detail below, said depressed area having a centrally located, circular opening 22 formed therein and communicating with the compartment 24 defined by the walls of the housing 12.

Secured to the bottom wall 15 of the housing 12 within the compartment 24 is an electric drive motor 26, said drive motor having a shaft 27 operatively engaging the periphery of a spring biased drive roller 28 which, in turn, is biased into operative engagement with the periphery of a first carriage 30 constituted by a rotatable platen 32 located immediately below the centrally located opening 22 in the depressed area 20 of the top wall 18.

The rotatable platen 32 may be formed from metal by die casting or any suitable process and incorporates a peripheral rim 34 and is mounted for rotation on a spindle 36 which is journaled in a bearing block 38 secured to the bottom wall 15 of the housing 12. Therefore, rotation of the rotatable platen 32 constituting the first carriage 30 of the recording and record playing device is accomplished by energization of the drive motor 26 and the associated spring biased drive roller 28.

Mounted in the first carriage 30 constituted by the rotatable platen 32 is a second carriage 40, said second carriage 40 being located for radial movement with respect to the center of the rotatable platen 32 in a radially oriented slot 42 formed in the rotatable platen 32. The second carriage 40 is incorporated in a substantially rectangular body 44 which, as best shown in FIG. 4 of the drawings, is provided with a dovetail connection 46 to maintain it in positive engagement with the opposite side walls of the elongated slot 42 in the rotatable platen 32.

Figure 4:
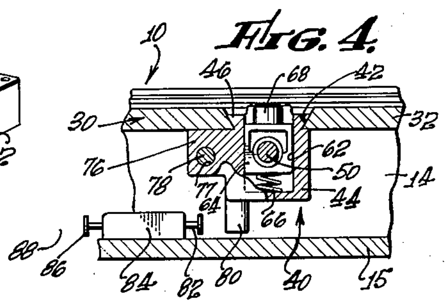
FIG. 4 is a fragmentary view taken from the broken line 4—4 of FIG. 3.
Figures 2, 3, 5:
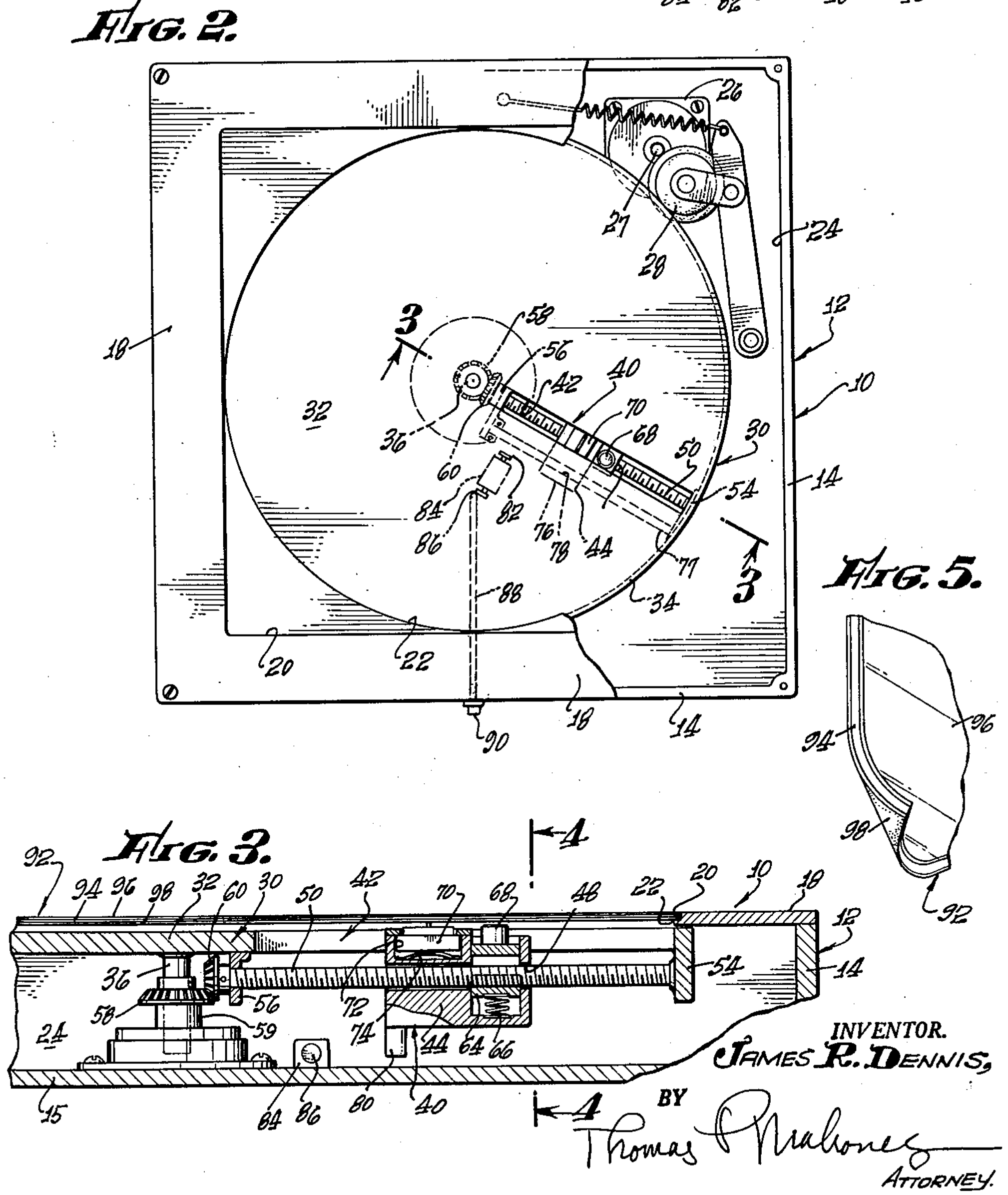
FIG. 2 is a top plan view of the recording mechanism.
FIG. 3 is a transverse sectional view taken on the broken line 3—3 of FIG. 2.
FIG. 5 is an enlarged, fragmentary view showing one form of the record blank of the invention.

The second carriage 40 is, as best shown in FIGS. 3 and 4 of the drawings, provided with an elongated bore 48 for the reception of a radially oriented lead screw 50 whose opposite ends are supported, respectively, in bearings 54 and 56 located and supported upon the underside of the rotatable platen 32.

A bevel drive gear 58 is mounted on a boss 59 and fixed against rotation with respect to a bevel driven gear 60 secured to the inner extremity of the lead screw 50. Therefore, when the rotatable platen 32 is rotated by the drive wheel or roller 28 constant rotation of the spindle 36 takes place due to the fact that the driven bevel gear 60 is rotated with respect to the fixed drive gear 58, thus causing rotation of the lead screw 50. Located in one end of the body 44 is a cavity 62 for the reception of a half nut 64 which is urged upwardly into engagement with the periphery of the lead screw 50 by a compression spring 66. Thus, the half nut 64 serves as a traveling nut which is designed to be translated with respect to the lead screw 50 when rotation of said lead screw is induced by rotation of the rotatable platen 32.

Formed integrally with the half nut 64 is a button 68 which, when depressed, causes disengagement between the half nut 64 and the periphery of the lead screw 50 in order that the second carriage 40 may be moved with respect to the lead screw 50. When the button 68 is released, the compression spring 66 once again engages the half nut 64 upon the periphery of the lead screw 50 to establish the operative relationship therebetween.

A magnetic recording and playback head 70 of conventional construction is located in a recess 72 in the body 44 of the second carriage 40 and is biased upwardly by the action of a leaf spring 74. It is, of course, understood that the magnetic recording and playback head 70 is operatively connected to conventional recording and reproducing circuits which are not shown here, but which are well known to those skilled in the art, in order that the magnetic recording and playback head 70 may be utilized, in a manner to be described in greater detail below, to both record and play back a record disposed in operative relationship with the recording and playback head 70.

A lateral extension 76 is provided on the body 44 of the second carriage 40 and incorporates a bore 77 for the reception of a guide rod 78 which serves to both guide and assist in the support of the body 44 in operative relationship with the rotatable platen 32.

A stop pin 80 is mounted on the body 44 of the second carriage 40 and is engageable with an actuating arm 82 of a limit switch 84 of conventional construction when the second carriage 40 reaches its innermost limit of movement so that the drive motor 26 will be de-energized to halt the rotation of the rotatable platen 32 and the radial movement of the second carriage 40 upon the completion of a record disposed in operative relationship with the recording head 70. The limit switch 84 is provided with an energizing arm 86 engageable by a push rod 88 which is, in turn, movable by means of a button 90 located on the exterior of the housing 12 of the recording and playing device so that, after the recording head 70 has been shifted to the outer extremity of the slot 42 by depression of the button 68, depression of the button 90 will re-energize the motor 26 to cause radial movement of the recording head 70 in the second carriage 40 and rotation of the platen 32.

It is to be understood that the limit switch 84 may be connected in the recording and playback circuits so that simultaneous energization and de-energization of said circuits may occur with termination or initiation of rotation of the first carriage 30 and the second carriage 40.

Figures 6, 7, 8, 9, 10, 11, 12, 13, 14:
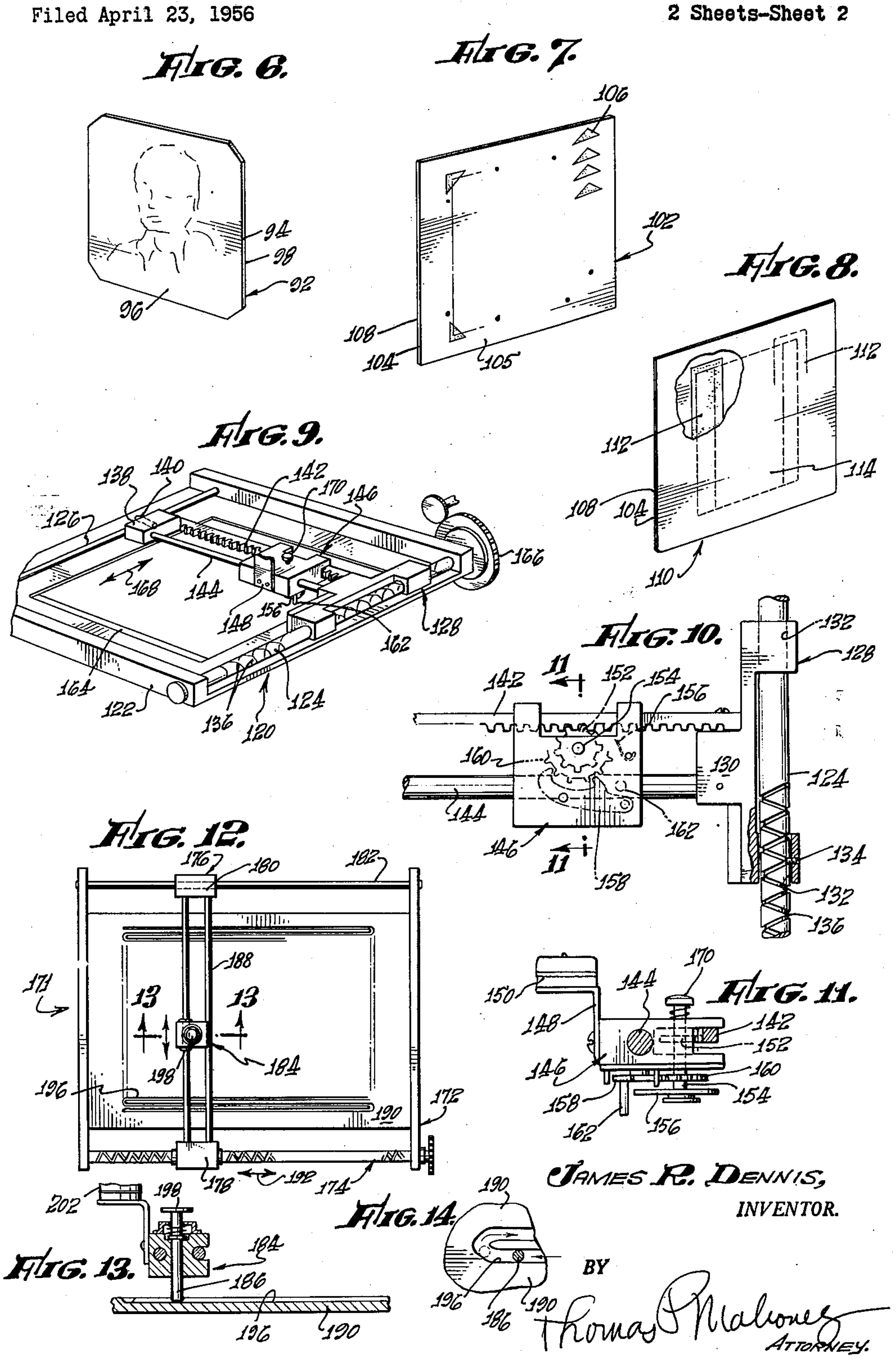
FIG. 6 is a view showing one embodiment of a record blank constructed in accordance with the teachings of my invention.
FIG. 7 is a view showing an alternative embodiment of the record blank.
FIG. 8 shows another embodiment of the record blank of my invention.
FIG. 9 is a perspective view of an alternative embodiment of the recording mechanism of my invention.
FIG. 10 is an enlarged, fragmentary view of the mechanism shown in FIG. 9.
FIG. 11 is a transverse, sectional view taken on the broken line 11—11 of FIG. 10.
FIG. 12 is a top plan view of an alternative embodiment of the recording mechanism of my invention.
FIG. 13 is a transverse, sectional view taken on the broken line 13—13 of FIG. 12.
FIG. 14 is an enlarged, fragmentary view showing the manner in which the guide pin incorporated in the embodiment of FIG. 12 fits within the guide groove thereof.

A typical recording blank 92 adapted to be utilized in conjunction with the record recording and playing device 10 of my invention is shown in FIGS. 1, 5 and 6 of the the drawings and includes a base sheet 94 formed from a conventionally utilized material such as paper and having applied to one side thereof a light sensitive emulsion layer 96 and to the other side thereof a magnetically susceptible layer 98 upon which an auditory signal can be impressed by the action of the magnetic head 70 in a well known and conventional manner. Therefore, after a photograph or other visual image has been printed on the light sensitive emulsion layer 96, the record blank 92 can be placed in the depressed area 20 of the top wall 18 to expose it to the recording action of the magnetic recording head 70, as best shown in FIGS. 1, 3 and 4 of the drawings.

To make a record on the magnetic layer 98, the recording head 70 and its associated second carriage 40 are located at the outer perimeter of the first carriage 30 constituted by the rotatable platen 32 by disengaging the traveling half nut 64 from operative relationship with the periphery of the lead screw 50 by the expedient of depressing the traveling nut disengagement button 68. As previously indicated, release of the button 68 permits the compression spring 66 associated with the traveling half nut 64 to be urged into operative relationship with the periphery of the lead screw 50. The depression of the button 90 causes longitudinal movement of the push rod 88 serving to depress the actuating arm 86 of the limit switch 84 which energizes said limit switch to energize the drive motor 26 and the recording circuits associated with the record playing and recording device 10.

Energization of the driven motor 26 causes concomitant rotation of the first carriage 30 constituted by the rotatable platen 32 and radial and inward movement of the second carriage 40 which supports the magnetic head 70. Thus, a person utilizing the recording and record playing device 10 can record upon the back of the record blank 92 a message or other relevant data pertinent to the visual image which appears upon the front of the blank. When the message is completed, or when the stop pin 80 engages the de-energizing arm 82 of the limit switch 84, the drive motor 26 can be energized to halt movement of the first and second carriages 30 and 40 and the record 92 can be removed from operative relationship with the record playing and recording device 10.

The second carriage 40 can then be shifted to the outer edge of the first carriage 30 by depressing the button 68 to disengage the traveling half nut 64 from operative relationship with the lead screw 50 in the above described manner and the record playing and recording device is, once again, ready to record or play back a record imposed thereupon.

An alternative embodiment 102 of the record blank of my invention is shown in FIG. 7 and includes a base 104 formed from cardboard or the like upon which a photograph or other visual image 105 can be secured by the use of adhesive corner mounts 106. A magnetic layer 108 is deposited upon the opposite side of the base 104 and thus the record blank 102 can be used in conjunction with photographs or other visual images taken prior to the time at which the record blank 92 shown in FIG. 6 of the drawings was available.

Another embodiment 110 of the record blank of my invention is shown in FIG. 8 of the drawings which is similar in all respects to the record blank 102 of FIG. 7 with the exception that elongated, laterally spaced adhesive strips 112 are provided upon the face of the blank to mount a photograph or other visual image in operative association with the blank 110 and a perforated tissue sheet 114 is operatively associated with said strips to cover said strips prior to the utilization of the same by the adherence of a photograph or other visual image thereto.

An alternative embodiment 120 of the recording and playing device of my invention is shown in FIGS. 9–11 of the drawings and includes a substantially rectangular frame 122 which mounts a compound lead screw 124 and a guide and supporting rod 126 disposed in parallel and spaced relationship therewith. A first carriage 128 is operatively supported upon the guide rod 126 and lead screw 124, said first carriage having an end block 130 provided with spaced bores 132 encompassing the lead screw 124 and one of said bores being provided with a pin 134 engageable with the grooves 136 in the compound lead screw 124.

A supporting block 138 is located at the opposite end of the first carriage 128 and is provided with a pin 140 engageable with the guide rod 126 to maintain said supporting block in operative relationship therewith. A rack 142 and a guide rod 144 have their opposite extremities secured, respectively, to the end block 130 and the supporting block 138 to mount a second carriage 146 which is provided with a bracket 148 which supports a magnetic recording and playback head 150.

A pinion 152 is engageable with the rack 141 and is supported for rotation on and by a shaft 154, said shaft being energizable by a spiral spring 156. An escapement constituted by a dog 158 and a sprocket 160 engageable by said dog controls the rotation of the shaft 154 by the spiral spring 156 and is, in turn, controlled by an actuating pin 162. An actuating bar 164 is provided, as best shown in FIG. 9, on the frame 122 and is engageable with the actuating pin 162, in a manner to be described in greater detail below.

A drive gear 166 is connected to the end of the compound lead screw 124 and when the drive gear 166 is energized by a motor or other appropriate means, movement of the first carriage 128 in the direction of the arrow 168 with reference to the frame 122 will be caused. When the first carriage 128 reaches the end of its travel, it automatically returns because of the compound groove 136 provided in the lead screw 124. Thus, at each backward and forward movement in the direction of the arrows 168, the carriage 128 inscribes a line of recording on a record disposed in operative relationship with the recording head 150 and the shift from a recorded line to a blank portion of the record blank is accomplished by the impingement of the actuating pin 162 on the actuating bar 164 which deflects the actuating pin 162 to release the dog 158 from the sprocket 160 to permit partial revolution of the shaft 154 and to index the second carriage 146 with reference to the rack 142 by the rotation of the pinion 152 engaged thereupon to dispose the recording head 150 on a fresh portion of the record blank operatively disposed thereupon.

When the recording head and the second carriage 146 have reached the end of their travel, a button 170 is depressed to release the pinion 152 from the rack 142, and thus permit the second carriage 146 to be shifted back to its original position.

An alternative embodiment 171 of the record recording and playing device of my invention is shown in FIGS. 12–14 as including a frame 172 of substantially rectangular configuration in which is mounted a rotatable compound lead screw 174 which serves as partial support and drive means for a first carriage 176 which is operatively engaged therewith by means of a support and drive block 178 and whose opposite end is supported by a support block 180 engaged upon a guide rod 182.

Mounted upon laterally spaced guide rods 188, extending between the drive and support blocks 178 and 180, is a second carriage 184 which mounts a guide pin 186 having a head 198. A guide plate 190 constitutes part of the frame 172 and is provided with a continuous guide groove 196 engageable by the lower extremity of the guide pin 186.

Therefore, when the first carriage 176 is reciprocated across the frame 172 in the direction of the arrows 192, the pin 186 will guide the recording head 202 with reference to a recording blank superimposed thereupon. When the end of one of the grooved lines 196 is reached, the magnetic recording head 202 will be carried downwardly by the second carriage 184 to traverse grooved line 196 therebelow and thus the second carriage 184 will traverse the guide plate 190 and a recording blank superimposed upon the recording head 202 in a direction at right angles to the direction of movement of the first carriage 176. When the second carriage 184 reaches the end of its travel at the bottom of the guide plate 190, the guide pin 186 can be raised from operative relationship with the continuous guide groove 196 to permit the second carriage 184 to be shifted back to its original and starting position at the top of the guide plate 190.

I thus provide by my invention a record recording and playback device which is adapted to be utilized in conjunction with a recording blank having a visual image disposed on one surface thereof and a magnetically susceptible recording surface provided on the other side thereof so that data pertinent to the visual image will be recorded upon the magnetically susceptible surface. Thus, it is possible to preserve in great detail information with the visual image which might otherwise become lost or displaced or might not be so readily available.

I claim as my invention:

1. In a recording device, the combination of: a housing having an opening in the upper surface thereof; a support for a record blank on said housing adjacent said opening; a primary carriage mounted in said housing for rotary movement with respect to said blank, said primary carriage having track means thereupon and being constituted by a rotatable disc having a radial slot therein; a drive motor connected to said primary carriage to rotate the same; a secondary carriage located in said slot and mounted on said track means for radial movement with respect to said primary carriage; drive means interconnecting said primary and secondary carriages, said drive means including said disc and a lead screw supported below said slot upon said disc, said lead screw having a disengageable traveling nut normally urged into engagement therewith and connected to said secondary carriage; a release button projecting upwardly through said slot for momentarily releasing said nut from said lead screw; and a recording head on said secondary carriage for making a record on said blank.

2. In a recording device, the combination of: a housing having an opening in the upper surface thereof; a support for a record blank on said housing adjacent said opening; a primary carriage mounted in said housing for rotary movement with respect to said blank, said primary carriage having track means thereupon and being constituted by a rotatable disc having a radial slot therein; a drive motor connected to said primary carriage to rotate the same; a secondary carriage located in said slot and mounted on said track means for radial movement with respect to said primary carriage, said secondary carriage having a stop abutment thereupon; drive means interconnecting said primary and secondary carriages, said drive means including said disc and a lead screw supported below said slot upon said disc, said lead screw having a disengageable traveling nut normally urged into engagement therewith and connected to said secondary carriage; a release button projecting upwardly through said slot for momentarily releasing said nut from said lead screw; a recording head on said secondary carriage for making a record on said blank; and a switch connected to said motor and engageable by said stop abutment on said secondary carriage to automatically de-energize said motor when said secondary carriage has reached a point adjacent the inner extermity of said slot.

3. In a recording device, the combination of: a housing having an opening in the upper surface thereof; a support for a record blank on said housing adjacent said opening; a primary carriage mounted in said housing for rotary movement with respect to said blank, said carriage having track means thereupon and being constituted by a rotatable disc having a radial slot therein; a drive motor connected to said primary carriage to rotate the same; a secondary carriage located in said slot and mounted on said track means for radial movement with respect to said primary carriage, said secondary carriage having a stop abutment thereupon; drive means interconnecting said primary and secondary carriages, said drive means including said disc and a lead screw supported below said slot upon said disc, said lead screw having a disengageable traveling nut normally urged into engagement therewith and connected to said secondary carriage; a release button projecting upwardly through said slot for momentarily releasing said nut from said lead screw; a recording head on said secondary carriage for making a record on said blank; a switch connected to said motor and engageable by said stop abutment on said secondary carriage to automatically de-energize said motor when said secondary carriage has reached a point adjacent the inner extremity of said slot; and an actuator button mounted on the exterior of said housing for returning said switch to operative position in order to energize said motor.

References Cited in the file of this patent

UNITED STATES PATENTS

| | | |
|---|---|---|
| 850,036 | Morin | Apr. 9, 1907 |
| 1,792,325 | Rugg | Feb. 10, 1931 |
| 1,864,519 | Boularan et al. | June 28, 1932 |
| 1,913,913 | Boularan et al. | June 13, 1933 |
| 1,940,274 | Severy | Dec. 19, 1933 |
| 2,002,393 | Freed | May 21, 1935 |
| 2,124,673 | Puma | July 26, 1935 |
| 2,455,712 | Von Soden | Dec. 7, 1948 |
| 2,486,662 | Leitner | Nov. 1, 1949 |
| 2,505,787 | Munkacsi | May 2, 1950 |
| 2,519,592 | Muller et al. | Aug. 22, 1950 |
| 2,528,611 | Saffady | Nov. 7, 1950 |
| 2,690,340 | Harrison et al. | Sept. 28, 1954 |
| 2,793,864 | Dietz | May 28, 1957 |